(12) United States Patent
Träger

(10) Patent No.: US 12,343,940 B2
(45) Date of Patent: Jul. 1, 2025

(54) APPARATUS FOR CLEANING PRINTED 3D OBJECTS

(71) Applicant: MÜHLBAUER TECHNOLOGY GMBH, Hamburg (DE)

(72) Inventor: Jens Träger, Hetlingen (DE)

(73) Assignee: MÜHLBAUER TECHNOLOGY GMBH, Hamburg (DE)

( * ) Notice: Subject to any disclaimer, the term of this patent is extended or adjusted under 35 U.S.C. 154(b) by 0 days.

(21) Appl. No.: 18/010,133

(22) PCT Filed: Feb. 16, 2022

(86) PCT No.: PCT/EP2022/053792
§ 371 (c)(1),
(2) Date: Dec. 13, 2022

(87) PCT Pub. No.: WO2022/175311
PCT Pub. Date: Aug. 25, 2022

(65) Prior Publication Data
US 2023/0382046 A1    Nov. 30, 2023

(30) Foreign Application Priority Data
Feb. 22, 2021    (DE) .................... 10 2021 104 076.0

(51) Int. Cl.
*B29C 64/35*    (2017.01)
*B08B 3/08*    (2006.01)
(Continued)

(52) U.S. Cl.
CPC ............... *B29C 64/35* (2017.08); *B08B 3/08* (2013.01); *B08B 3/104* (2013.01); *B08B 3/14* (2013.01);
(Continued)

(58) Field of Classification Search
CPC ................................. B33Y 40/20; B29C 64/35
See application file for complete search history.

(56) References Cited

U.S. PATENT DOCUMENTS

| | | | | |
|---|---|---|---|---|
| 5,339,844 A | * | 8/1994 | Stanford, Jr. ............. | B08B 3/12 134/107 |
| 8,767,213 B2 | * | 7/2014 | Pimputkar .............. | D06F 34/22 356/73 |

(Continued)

FOREIGN PATENT DOCUMENTS

| | | |
|---|---|---|
| CN | 111989178 | 11/2020 |
| DE | 10 2005 049 473 | 4/2007 |

(Continued)

OTHER PUBLICATIONS

International Search Report & Written Opinion, International Patent Application No. PCT/EP2022/053792, mailed May 12, 2022, 5 pages.

*Primary Examiner* — Omair Chaudhri
(74) *Attorney, Agent, or Firm* — CASIMIR JONES, S.C.; Brian F. Bradley

(57) ABSTRACT

The invention relates to: an apparatus (1) for the post-cleaning of 3D objects (90), which are printed from a light-curing resin formulation and comprise uncured residues of the resin formulation which adhere to the surface and have non-translucent and insoluble particles; and the use of a corresponding apparatus. The apparatus (1) comprises a cleaning chamber (2), which can be filled with a liquid cleaning agent (20) and has an agitator (5), for receiving the 3D object (90) to be cleaned, wherein a contamination detector (8), which is connected to a control unit (11) and determines the optical density of the cleaning agent (20), is provided for checking the remaining cleaning capacity of the cleaning agent (20), wherein the contamination detector (8) is located in an area kept free of non-translucent and (Continued)

insoluble particles above a predefined size in the cleaning agent (20). The determined optical density is used to determine the cleaning capacity of the cleaning agent (20).

17 Claims, 1 Drawing Sheet

(51) Int. Cl.
  *B08B 3/10* (2006.01)
  *B08B 3/14* (2006.01)
  *B08B 13/00* (2006.01)
  *B33Y 40/20* (2020.01)
  *C11D 3/43* (2006.01)
(52) U.S. Cl.
  CPC ............ *B08B 13/00* (2013.01); *B33Y 40/20* (2020.01); *C11D 3/43* (2013.01); *C11D 2111/18* (2024.01)

(56) References Cited

U.S. PATENT DOCUMENTS

| | | | | |
|---|---|---|---|---|
| 8,863,763 | B1* | 10/2014 | Chen | B08B 3/12 134/113 |
| 2002/0059943 | A1* | 5/2002 | Inagaki | C11D 7/10 134/36 |
| 2002/0066470 | A1* | 6/2002 | Farr | C23G 3/00 134/107 |
| 2004/0117920 | A1* | 6/2004 | Fyvie | D06F 43/086 8/158 |
| 2007/0084487 | A1 | 4/2007 | Hoffmann et al. | |
| 2007/0138401 | A1* | 6/2007 | Tokhtuev | G01J 3/42 356/328 |
| 2007/0143933 | A1* | 6/2007 | Potyrailo | D06F 34/22 68/12.02 |
| 2009/0212236 | A1* | 8/2009 | Tokhtuev | G01N 21/6402 250/564 |
| 2009/0283109 | A1* | 11/2009 | Moussa | B08B 3/06 134/1 |
| 2010/0000265 | A1* | 1/2010 | Hendrickson | D06F 39/022 68/12.18 |
| 2012/0097256 | A1* | 4/2012 | Lopaciuk | A47L 15/0055 137/391 |
| 2012/0240958 | A1* | 9/2012 | Higuchi | H01L 21/67051 134/10 |
| 2013/0278921 | A1* | 10/2013 | Choi | G01N 21/534 356/51 |
| 2015/0165489 | A1* | 6/2015 | Powell | C10G 3/54 134/18 |
| 2015/0221530 | A1* | 8/2015 | Hara | H01L 21/67017 134/57 R |
| 2017/0311770 | A1* | 11/2017 | Jones | A47L 11/4002 |
| 2018/0014713 | A1* | 1/2018 | Hofmann | A47L 15/4259 |
| 2018/0078975 | A1* | 3/2018 | Bhoyar | B08B 3/14 |
| 2018/0250719 | A1* | 9/2018 | Droege | B01F 25/20 |
| 2018/0275052 | A1* | 9/2018 | Walsh | G01N 21/645 |
| 2019/0151904 | A1* | 5/2019 | Bauer | B08B 3/04 |
| 2020/0277720 | A1* | 9/2020 | Eiselt | D06F 34/22 |
| 2020/0282657 | A1 | 9/2020 | Wighton et al. | |
| 2020/0316501 | A1* | 10/2020 | Jones | B01D 33/466 |
| 2020/0319092 | A1* | 10/2020 | Schenkl | G05B 19/042 |
| 2020/0324479 | A1* | 10/2020 | Friedrich | B22F 10/12 |
| 2021/0131949 | A1* | 5/2021 | Gast | G02B 27/0006 |
| 2021/0138554 | A1 | 5/2021 | Zeilinger et al. | |
| 2021/0276055 | A1* | 9/2021 | Nakamura | H01L 21/67051 |
| 2022/0001621 | A1* | 1/2022 | Schultheiss | B33Y 10/00 |
| 2022/0010969 | A1* | 1/2022 | Kufner | G06K 7/1417 |
| 2023/0116485 | A1* | 4/2023 | Schade | A47L 15/4297 68/12.02 |

FOREIGN PATENT DOCUMENTS

| | | | | |
|---|---|---|---|---|
| DE | 19806560 B4 | * | 8/2007 | ............ D06F 39/004 |
| DE | 10 2013 114 812 | | 6/2015 | |
| DE | 102018127458 A1 | * | 5/2019 | |
| DE | 10 2020 131 307 | | 6/2022 | |
| EP | 1977835 | | 10/2008 | |
| EP | 3165902 A1 | * | 5/2017 | |
| JP | H06151400 | | 5/1994 | |
| JP | H11233478 | | 8/1999 | |
| KR | 960023427 A | * | 7/1996 | |
| WO | WO-2019093251 A1 | * | 5/2019 | ............ B01D 17/04 |
| WO | 2019111208 | | 6/2019 | |
| WO | 2020165430 | | 8/2020 | |

* cited by examiner

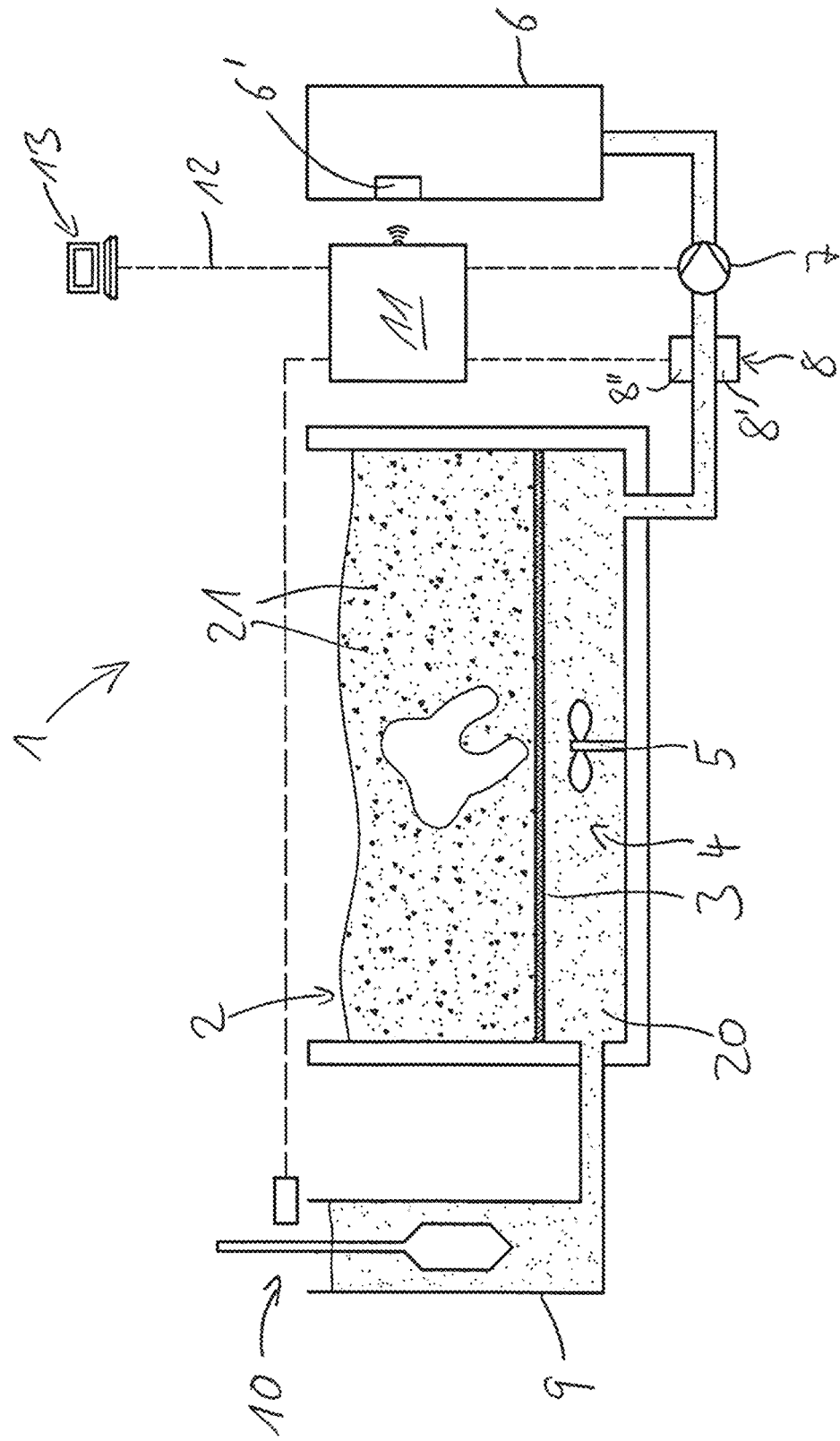

APPARATUS FOR CLEANING PRINTED 3D OBJECTS

The invention relates to an apparatus for the post-cleaning of 3D objects, which are printed from a light-curing resin formulation comprising insoluble filler particles and have uncured residues of the resin formulation, which adhere on the surface, and to the use of a corresponding apparatus.

3D printers of various designs and for different printing methods are known in the prior art. One known printing method is in this case the stereolithographic method, in which a suitable liquid resin or monomer formulation is cured pointwise by controlled exposure in order to generate a desired three-dimensional object layer by layer.

In conventional stereolithography, a focused laser beam is for this purpose deflected by means of a mirror which can be turned about two mutually perpendicular axes in order to address and thus expose the resin at the points to be cured in a layer. Particularly when relatively large areas are intended to be cured, this method is time-consuming since areas to be cured have to be addressed pointwise and the areas thus essentially have to be scanned by the laser. In the case of relatively large objects, distortions may also occur in the edge region if the laser impinges only at a shallow angle on the resin to be cured.

As alternative thereto, the so-called digital light processing (DLP) printing method has been developed. In this method, the light of a light source is guided by means of a digital micromirror unit onto the resin to be cured. The micromirror unit in this case comprises a rectangular arrangement of tiltable micromirrors, which can be driven individually. Typical micromirror units comprise 1920× 1080 individual controllable mirrors, which can be turned between a position in which the light impinging on them is deviated onto a respectively predetermined point in the resin and a second position, in which this does not happen. The number of individually curable points in a layer of the resin is predetermined by the number of mirrors of the micromirror unit. The ultimate size of the individual points in the resin may be influenced by the distance between the micromirror unit and the layer to be exposed.

Embodiments are furthermore known in the prior art in which, instead of a micromirror unit illuminated by a light source, an LCD display illuminated from behind by a two-dimensional light source is used in order to cure resin at desired points. In this case, the LCD display, which can selectively transmit the light of the illumination behind it at individual points, must be arranged directly on the layer with the points to be cured in the otherwise liquid resin.

In the case of objects generated with corresponding 3D printers, uncured residues of the resin formulation, which are to be removed, generally still adhere after removal from the 3D printers. For this purpose, it is known to treat the 3D objects with a liquid cleaning agent which chemically removes the uncured residues of the resin formulation without attacking the actual 3D object, or the cured material thereof.

By the processes taking place during this cleaning in order to detach the residues of the resin formulation, the cleaning agent is gradually depleted, so that the cleaning performance of the cleaning agent decreases with each cleaning process until it no longer exerts a sufficient cleaning effect.

In the prior art, it is proposed to restrict the number of cleaning cycles to be carried out with a cleaning agent and to replace the cleaning agent after the predetermined number is reached. In this case, the number is generally selected to be so small that, with in principle large resin adhesions of each of the 3D objects to be cleaned, a sufficient cleaning effect is achieved in all cleaning cycles. This has the disadvantage that if, at least in some cleaning cycles, only small residues of the resin formulation are to be removed and the cleaning agent is therefore used up only little, the cleaning agent is replaced because the predetermined number of cleaning cycles has been reached even though it would in principle still be suitable for further cleaning processes.

Document WO 2019/111208 A1 relates to an apparatus for cleaning 3D objects, in which a fork light barrier is arranged as a contamination sensor in the cleaning chamber. If the amount of light registered by the light sensor decreases, this indicates an increased proportion of non-translucent particles in the cleaning agent, which allows conclusions relating to the contamination. The non-translucent particles detached from a 3D object by a suitable cleaning agent are generally fillers or pigments from the resin formulation.

It has been found that the degree of contamination of the cleaning agent which is determined by the light-based contamination sensor disclosed in document WO 2019/111208 A1 is very inaccurate and only approximately allow conclusions relating to the actual cleaning capacity of the cleaning agent.

It is an object of the present invention to provide an apparatus for the cleaning of printed 3D objects and the use thereof, with which the disadvantages of the prior art no longer occur, or occur only to a reduced extent.

This object is achieved by an apparatus as claimed in the main claim, as well as by the use thereof as claimed in claim 13. The dependent claims relate to advantageous refinements.

Accordingly, the invention relates to an apparatus for the post-cleaning of 3D objects, which are printed from a light-curing resin formulation and have uncured residues of the resin formulation, which adhere on the surface and have non-translucent and insoluble particles, comprising a cleaning chamber, which can be filled with a liquid cleaning agent and has an agitator for receiving the 3D object to be cleaned, wherein a contamination detector, which is connected to a control unit and determines the optical density of the cleaning agent at at least one wavelength in the range of from 320 nm to 400 nm, is provided for checking the remaining cleaning capacity of the cleaning agent, the contamination detector being located in a region kept free of non-translucent and insoluble particles above a predetermined size in the cleaning agent, and the control unit is configured to determine the cleaning capacity of the cleaning agent from the optical density which has been determined and to output a corresponding indication if a predetermined minimum cleaning capacity is fallen below.

The invention furthermore relates to the use of the apparatus according to the invention for the post-cleaning of a 3D object, which is printed from a light-curing resin formulation, with the aid of a liquid cleaning agent with which the cleaning chamber is filled, in order to remove uncured residues of the resin formulation, which adhere on the surface of the 3D object and have non-translucent and insoluble particles.

With the apparatus according to the invention, it has been discovered that the monitoring of the cleaning capacity of the cleaning agent, which is not based on the absorption of light by non-translucent particles, is much more accurate and more reliable. Furthermore, with the apparatus according to the invention, it is also possible to use cleaning agents in the cleaning chamber in which insoluble abrasives, with which the surface of the 3D object to be cleaned is optimized, are dispersed (cf. for example patent application DE 10 2020 131 307.1).

For this purpose, the apparatus comprises a contamination detector, which is arranged in a region separated from the cleaning chamber by a filter element, so that solid particles above a size predetermined by the filter element do not reach the contamination detector, where they could vitiate the measurement result.

The contamination detector is a detector for determining the optical density of the cleaning agent at one or more wavelengths in the range of from 320 nm to 400 nm, that is to say in the ultraviolet UV(A) range outside the visible range. The invention has discovered that, during the cleaning of printed 3D objects with a suitable cleaning agent, constituents of a known resin formulation entering the cleaning agent absorb electromagnetic radiation in the aforementioned wavelength range at least to a considerable extent. If the cleaning agent has no absorption or only a basic absorption in this wavelength range, the increase of the optical density allows conclusions relating to the remaining cleaning capacity of the cleaning agent. In this case, it has been found that determining of the cleaning capacity of the cleaning agent on the basis of the optical density in a non-visible range allows much more precise and more reliable predictions than measurements on non-translucent solid particles in the cleaning agent. The apparatus according to the invention also allows the use of insoluble abrasives in the cleaning chamber, which would not be possible for example with the apparatus according to WO 2019/111208 A1.

The control unit connected to the contamination detector is configured to derive the cleaning capacity, for example in the form of an index value, from the optical density which has been determined. If the cleaning capacity which has been determined falls below a predetermined minimum cleaning capacity, the control unit outputs an indication so that a user may replace the cleaning agent.

The basic cleaning capacity, or the decrease thereof, but also a value of the predetermined minimum cleaning capacity, may depend on the cleaning agent, or the composition thereof. The control unit may be provided with suitable parameters for different cleaning agents, from which the parameters suitable in each case for the cleaning agent actually being used are then selected.

The indication may be carried out in any desired way, for example by a suitable optical and/or acoustic display on the cleaning apparatus itself. It is, however, also possible for the control unit to send a suitable indication signal to another apparatus, for example a superordinate apparatus, which then suitably processes the indication in an automated fashion and/or outputs it to a user.

In order to allow maximally variable use of the apparatus according to the invention and to minimize the risk of contact of a user with the cleaning agent, it is preferred to provide a replaceable storage container for cleaning agent and a pump for delivering cleaning agent from the storage container into the cleaning chamber and from the cleaning chamber into the storage container, the contamination detector preferably being arranged in the line between the storage container and the cleaning chamber and the filter element being arranged between the contamination detector and the cleaning chamber.

By providing a corresponding storage container and a pump, it is possible to achieve the effect that cleaning agent is contained in the cleaning chamber only during the actual cleaning, while for the rest of the time it is pumped into the storage container. For example, during the introduction of a printed 3D object into the cleaning chamber and its removal therefrom, the latter is thus not filled with cleaning agent so that contact of a user with the cleaning agent is effectively avoided.

By providing a replaceable storage container, replacement of the cleaning agent is readily possible. This is because, by the cleaning agent being located in the storage container outside the actual cleaning, the cleaning agent may be replaced by simple replacement of the storage container. The apparatus may also be operated easily with different cleaning agents.

The preferred arrangement of the contamination detector in the line between the storage container and the cleaning chamber offers the advantage that the cleaning capacity of the cleaning agent may be determined during the pumping into or out from the cleaning chamber over the entire cleaning agent, for example as an average value. Effects possibly occurring locally when the contamination detector is arranged in the cleaning chamber itself, by which the measurement result could be vitiated, may thus be avoided. Furthermore, arranging the contamination detector in the line generally allows simple retrofitting of an already existing cleaning apparatus so as to form an apparatus according to the invention, merely by the line in question or at least a part thereof needing to be replaced or adapted.

If a replaceable storage container is provided, it is preferred for this to have a memory element, preferably an RFID element, which can be read out by the control unit and on which the current cleaning capacity of the cleaning agent held in the storage container is recorded. Information items relating to the cleaning agent contained in the storage container, such as its designation and/or composition, may also be recorded on the memory element. The parameters required for the control unit, in order to derive the cleaning capacity from an optical density which has been determined, may also be recorded on the memory element and read out by the control unit during use. By the relevant information items being recorded on the memory element of the storage container, the latter may be used with different apparatuses according to the invention, without relevant information items relevant with a view to the cleaning capacity possibly not being available in the individual apparatuses or having to be centrally managed elaborately.

It is preferred for the control device to be configured to determine the optical density of the cleaning agent respectively before and after a cleaning process. If a storage container is provided, and if the contamination detector is arranged in the line between the storage container and the cleaning chamber, the respective measurement may be carried out while pumping the cleaning agent into or out from the cleaning chamber.

By a corresponding measurement before and after a cleaning process, the degradation of the cleaning agent due to the cleaning may be established. It is preferred for the control device to be configured to determine a decrease of the cleaning capacity from the difference of the optical density of the cleaning agent before and after a cleaning process and to adapt accordingly an output value of the cleaning capacity, which in particular reflects the cleaning capacity determined after the previous cleaning process and, for example, may be recorded on the memory element of the storage container.

It is preferred for the control device to be configured to take into account predetermined characteristic curves for the combination of cleaning agent and the light-curing resin formulation from which the 3D object is produced, in order to determine the cleaning capacity of the cleaning agent from the optical density and/or in order to determine the decrease of the cleaning capacity with the aid of the difference of the optical density before and after a cleaning process. In this way, it is possible to use a cleaning agent for cleaning 3D objects consisting of different resin formulations. Particularly if a cleaning agent is used for cleaning 3D objects consisting of different resin formulations, the variation of the cleaning capacity of the cleaning agent may be tracked accurately at each cleaning process. In this way, the risk of an inapplicable estimation of the cleaning capacity, which may result in deficient cleaning or the disposal of cleaning agent which is still usable, may be reduced.

In order to be able to determine the cleaning capacity remaining after a cleaning process as accurately as possible, it is advantageous for the control unit to possess information items relating to the resin formulation of a 3D object to be cleaned. In order to supply these information items, the control unit preferably has an input for information items relating to the light-curing resin formulation from which the 3D object is produced. The information items in question may be made available via this input, for example from a 3D printer upstream of the apparatus according to the invention. It is, however, also possible for an input terminal, via which a user may enter the information items in question, or for example select them from a suitable database, to be connected to the input.

For example, isopropanol, ethanol, dimethyl adipate, butyl diglycol, tripropylene glycol monomethyl ether (TPM) may be envisioned as the cleaning agent. Insofar as these substances are miscible with water, they are preferably also used as aqueous mixtures, and more preferably together with one or more suitable surface-active substances (surfactants). The aforementioned cleaning agents offer the advantage that they have no absorption or only little absorption in the wavelength range relevant here.

It has been found that it may in principle be sufficient for the optical density to be determined for only one wavelength. In this case, it is preferred in particular for the at least one wavelength to be selected in a range of from 365 nm to 385 nm.

The region around the contamination detector may be kept free of non-translucent and insoluble particles above a predetermined size in the cleaning agent in various ways. For example, before a measurement by the contamination detector, the cleaning agent may be brought to rest in such a way that the particles in question settle sufficiently because of gravity so that they are no longer present in the region of the contamination detector. It is, however, preferable to provide a filter element for keeping the region around the contamination detector free of non-translucent and insoluble particles above a predetermined size in the cleaning agent. A corresponding filter element offers the possibility of carrying out measurements with the contamination detector at any desired instant without being influenced by non-translucent and insoluble particles in the cleaning agent.

The filter element is preferably impermeable for solid particles with a size of more than 1 mm, preferably more than 0.1 mm, more preferably more than 0.01 mm or 0.001 mm. By the filter element, any abrasives and solid particles separated from the 3D object may then reliably be kept away from the contamination detector.

The contamination detector may be configured as a transmission detector, in which radiation from a radiation source, for example a light-emitting diode, is guided through the cleaning agent to be checked, before it is detected with a radiation sensor. The radiation source and the radiation sensor are in this case preferably matched to the wavelength(s) to be studied. As an alternative thereto, the contamination detector may also be configured as an ATR detector, with which relatively high optical densities of the cleaning agent may also be determined for one or more particular wavelengths.

It is preferred for the contamination detector or a further contamination detector to be configured as a refractometer for determining the refractive index of the cleaning agent, and for the control unit to be configured to take the refractive index into account in the determination of the cleaning capacity in addition to the optical density or to derive the optical density of the cleaning agent from the refractive index. Determination of the refractive index offers the advantage that it is not influenced, or is scarcely influenced, by the presence of even very small solid particles (in particular below the transmission size of the filter element). At the same time, the refractive index may also provide certain information about the cleaning capacity of a cleaning agent, if only by converting the refractive index approximately into the optical density of the cleaning agent. Corresponding conversions on the basis of empirically determined characteristic curves or conversion factors are known from the prior art.

The apparatus may furthermore comprise an apparatus, preferably an areometer, for determining the mass density of the cleaning agent, the control unit being configured to take the mass density determined by this apparatus into account in the determination of the cleaning capacity of the cleaning agent. Taking the mass density of the cleaning agent into account in addition to the optical density, and optionally the refractive index, allows even more accurate establishment of the cleaning capacity of the cleaning agent.

The invention will now be described by way of example with the aid of an advantageous embodiment with reference to the appended drawing, in which:

FIG. 1: shows an exemplary embodiment of an apparatus according to the invention.

FIG. 1 shows a cleaning apparatus 1 configured for the post-cleaning of a dental prosthesis as a 3D object 90 by the method according to the invention. The dental prosthesis 90 was produced in a 3D printing method according to the prior art from a light-curing resin formulation comprising insoluble filler particles.

The cleaning apparatus 1 comprises a cleaning chamber 2 for receiving a liquid cleaning agent 20. The bottom of the cleaning chamber 2 is formed by a grille, which acts as a filter element 3 for solid particles with a size of more than 0.1 mm. Abrasives 21 larger than 0.1 mm which are insoluble in the cleaning agent 20 and which—like filler particles of a corresponding size separated from the 3D object 90—are retained in the cleaning chamber 2 by the filter element 3 and in particular cannot enter the lower space 4 below the filter element 3, are added to the cleaning agent 20 in the cleaning chamber 2.

Arranged in the lower space 4, there is an agitator 5 by which the cleaning agent 20 is also moved over the filter element 3, so that when the agitator 5 is activated, a flow with which the abrasives 21 are also carried along the 3D object 90 is set up around the dental prosthesis 90.

A line, which leads to a replaceable storage container 6 comprising an RFID element 6', is connected to the lower space 4. Besides a pump 7, with which the cleaning agent 20 can selectively be pumped out from the replaceable storage container 6 into the cleaning chamber 2 or out from the cleaning chamber 2 into the replaceable storage container 6, a contamination detector 8 is also provided. The contamination detector 8 comprises a light-emitting diode as a radiation source 8' and a radiation detector 8", which are arranged on opposite sides of the line. The radiation source 8' and the radiation detector 8" are respectively designed for radiation with a wavelength of 385 nm and thus make it possible to determine the optical density of the fluid flowing through the line in the form of a transmission determination at a wavelength of 385 nm.

Likewise starting from the lower space 4, a vessel 9 is provided which communicates with the cleaning chamber 2, or the lower space 4, and in which a digitally readable areometer 10, with which the mass density of the cleaning agent 20 can be determined, is arranged.

The pump 7, the contamination detector 8 and the areometer 10 are connected to a control unit 11, which can evaluate the measurement data of the contamination detector 8 and of the areometer 10 and can drive the pump 7. The control unit 11 may also control the agitator 5 via a further control line (not represented). Furthermore, the control unit 11 is configured to read data from the RFID element 6' of the replaceable storage container 6, and update it when necessary, and possesses a data interface 12 via which indications can be sent from the control unit and information items can be received by the control unit. For example, the control unit 11 may be connected to a computer terminal 13 which provides a user interface for the control unit 11.

The control unit 11 is configured to determine the cleaning capacity of the cleaning agent 20 from the optical density determined by the contamination detector 8 and, when a predetermined minimum cleaning capacity is fallen below, to output a corresponding indication via the data interface 12, which is then for example displayed on the computer terminal 13.

The checking of the cleaning capacity of the cleaning agent 20 by the control unit will now be explained with reference to an exemplary cleaning process, which ultimately corresponds to the use according to the invention of the cleaning apparatus 1. The cleaning capacity is in this case specified as an index value, a higher index value reflecting a higher cleaning capacity. A minimum permissible index value which allows a further cleaning process with a cleaning agent 20 is furthermore predetermined.

In the initial state, there is no cleaning agent in the cleaning chamber 2. The abrasives 21 merely lie loosely on the filter element 3.

The 3D object 90 to be cleaned is placed into the cleaning chamber 2 by a user. The user furthermore selects on the computer terminal 13, from a database, the resin formulation from which the 3D object 90 has been printed. These information items relating to the resin formulation are provided to the control unit 11.

The user furthermore puts a replaceable storage container 6, having a cleaning agent 20 suitable in principle for the resin formulation of the 3D object 90, into the apparatus 1. The control unit 11 in this case reads out the data from the RFID element 6' of the replaceable storage container 6 and thus, besides information items relating to the composition of the cleaning agent 20, also obtains an index value concerning the cleaning capacity of the cleaning agent 20 contained in the replaceable storage container 6.

If the index value for the cleaning capacity which is read out from the RFID element 6' lies below the predetermined minimum index value, a corresponding indication is output via the data interface 12 and the computer terminal 13 to the user, which requests for a replaceable storage container 6 having cleaning agent 20 with a sufficient cleaning capacity to be inserted.

If the index value which is read out from the RFID element 6' lies above the predetermined minimum index value, the actual cleaning process begins. For this purpose, with the aid of the pump 7, the cleaning agent 20 is pumped out from the replaceable storage container 6 into the cleaning chamber 2. In this case, the optical density of the cleaning agent 20 is checked by the contamination detector 8, which—depending on the configuration of the control unit—may be used either to check the index value for the cleaning capacity, which is read out from the RFID element 6', or to calibrate the contamination detector 8 to this same value.

Once all the cleaning agent 20 has been introduced into the cleaning chamber 2, the mass density of the cleaning agent 20 is determined by means of the areometer 10 and temporarily stored in the control unit 11 together with the average value of the optical density, which has been determined by the contamination detector 8.

Subsequently, the agitator 5 is set in operation. The cleaning agent 20 therefore flows around the 3D object 90. At the same time, the abrasives 21 in the cleaning agent 20 are dispersed inside the cleaning chamber 2 and thus contribute to the surface treatment of the 3D object 90.

After a predetermined period of time, the agitator 5 is deactivated again and the mass density of the cleaning agent 20 is again determined by the areometer 10 and transmitted to the control unit 11. The cleaning agent 20 is then pumped back out from the cleaning chamber 2 into the storage container 6 by the pump 7, an average value of the optical density again being determined by the contamination detector 8 and transmitted to the control unit 11. The abrasives 21 are in this case retained in the cleaning chamber 2 by the filter element 3 and therefore do not enter the replaceable storage container 6.

Additional filters may also be provided, for example in the region of the line or the replaceable storage container 6, or the compartment provided therefor, so that particles not retained by the filter element 3 are also kept away from the replaceable storage container 6.

Once all of the cleaning agent 20 has been pumped out from the cleaning chamber 2, a user may remove the now cleaned 3D object 90.

The control unit 11 may determine the decrease of the cleaning capacity from the information items relating to the composition of the resin formulation of the 3D object 90 as well as of the cleaning agent 20 and the measurement values of the optical density and of the mass density before and after the cleaning process (at the respective temperature) with the aid of characteristic curves recorded in the control unit 11 for the respectively present combination of resin formulation and cleaning agent 20. This decrease may be represented in the form of an index value difference and deducted directly from the index value read out from the RFID element 6'. The index value determined in this way for the "new" cleaning capacity of the cleaning agent 20 is recorded on the RFID element 6', so that the respectively current cleaning capacity of the cleaning agent 20 contained in the replaceable storage container 6 is stored there for future cleaning processes.

If the updated index value for the cleaning capacity of the cleaning agent 20 lies below the minimum permissible index value which allows a further cleaning process with a cleaning agent 20, a corresponding indication that the cleaning agent 20 in the replaceable storage container 6 does not allow further cleaning and must be disposed of is output via the interface 12 and the computer terminal 13.

The invention claimed is:

1. An apparatus (1) for the post-cleaning of 3D objects (90), which are printed from a light-curing resin formulation and have uncured residues of the resin formulation, which adhere on the surface and have non-translucent and insoluble particles, the apparatus comprising;
 a cleaning chamber (2) with an agitator (5), wherein the cleaning chamber (2) can be filled with a liquid cleaning agent (20) and receives the 3D object (90) to be cleaned;
 a control unit (11);
 a contamination detector (8) connected to the control unit (11); wherein the contamination detector (8) determines the optical density of the cleaning agent (20) at at least one wavelength in the range of 320 nm to 400 nm, the contamination detector (8) being located in a region kept free of non-translucent and insoluble particles above a predetermined size in the cleaning agent (20) during the cleaning of the 3D object, and
 wherein the control unit (11) is configured to determine the cleaning capacity of the cleaning agent (20) from the optical density which has been determined and to output a corresponding indication if a predetermined minimum cleaning capacity is fallen below.

2. The apparatus as claimed in claim 1, characterized in that a replaceable storage container (6) for cleaning agent (20) and a pump (7) for delivering cleaning agent (20) from the replaceable storage container (6) into the cleaning chamber (2) and from the cleaning chamber (2) into the replaceable storage container (6) is provided.

3. The apparatus as claimed in claim 2, characterized in that the replaceable storage container (6) has a memory element, which can be read out by the control unit (11) and on which the current cleaning capacity of the cleaning agent (20) held in the replaceable storage container (6) is recorded.

4. The apparatus as claimed in claim 1, characterized in that the control unit (11) is configured to determine the optical density of the cleaning agent (20) respectively before and after a cleaning process.

5. The apparatus as claimed in claim 3, characterized in that the control unit (11) is configured to determine a decrease of the cleaning capacity from a difference of the optical density of the cleaning agent (20) before and after a cleaning process and to output an output value of the cleaning capacity according to the cleaning capacity decrease which has been determined.

6. The apparatus as claimed in claim 1,
 characterized in that the control unit (11) is configured to take into account predetermined characteristic curves for the combination of cleaning agent (20) and the light-curing resin formulation from which the 3D object (90) is produced, in order to determine the cleaning capacity of the cleaning agent (20) from the optical density and/or in order to determine a decrease of the cleaning capacity with the aid of a difference of the optical density before and after a cleaning process.

7. The apparatus as claimed in claim 6, characterized in that the control unit (11) has an input for information items relating to the light-curing resin formulation from which the 3D object (90) is produced.

8. The apparatus as claimed in claim 1,
 characterized in that the at least one wavelength is a wavelength selected in a range of 350 nm to 400 nm.

9. The apparatus as claimed in claim 1,
 characterized in that a filter element (3) is provided in order to keep the region around the contamination detector (8) free of non-translucent and insoluble particles above the predetermined size in the cleaning agent (20).

10. The apparatus as claimed in claim 1,
 further comprising a filter element (3) impermeable for solid particles with a size of more than 1 mm.

11. The apparatus as claimed in claim 1,
 characterized in that the contamination detector or a further contamination detector (8) is configured as a refractometer for determining a refractive index of the cleaning agent (20), and the control unit is configured to take the refractive index into account in the determination of the cleaning capacity in addition to the optical density or to derive the optical density of the cleaning agent (20) from the refractive index.

12. The apparatus as claimed in claim 1,
 characterized in that an apparatus is provided for determining the mass density of the cleaning agent (20), and the control unit (11) is configured to take the mass density determined by this apparatus into account in the determination of the cleaning capacity of the cleaning agent (20).

13. The apparatus as claimed in claim 2, wherein the contamination detector (8) is arranged in a line between the replaceable storage container (6) and the cleaning chamber (2) and a filter element (3) is arranged between the contamination detector (8) and the cleaning chamber (2).

14. The apparatus as claimed in claim 3, wherein the memory element is an RFID element (6').

15. The apparatus as claimed in claim 8, wherein the at least one wavelength is a wavelength selected in a range of 365 nm to 385 nm.

16. The apparatus as claimed in claim 10, wherein the filter element (3) is impermeable for solid particles with a size of more than 0.001 mm.

17. The apparatus as claimed in claim 12, wherein the apparatus provided for determining the mass density of the cleaning agent (20) is an areometer (10).

* * * * *